US012766916B2

(12) United States Patent
Iwazaki et al.

(10) Patent No.: US 12,766,916 B2
(45) Date of Patent: Oct. 20, 2026

(54) HEAT MANAGEMENT CONTROL SYSTEM FOR VEHICLE

(71) Applicant: Sanden Corporation, Gunma (JP)

(72) Inventors: Wataru Iwazaki, Gunma (JP); Osamu Takazawa, Gunma (JP); Atsuhiro Tadenuma, Gunma (JP); Kenzo Oba, Gunma (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 19/153,134

(22) PCT Filed: Mar. 26, 2024

(86) PCT No.: PCT/JP2024/011848
§ 371 (c)(1),
(2) Date: Aug. 1, 2025

(87) PCT Pub. No.: WO2024/219171
PCT Pub. Date: Oct. 24, 2024

(65) Prior Publication Data

US 2026/0225425 A1 Aug. 6, 2026

(30) Foreign Application Priority Data

Apr. 21, 2023 (JP) ................................. 2023-070313

(51) Int. Cl.
*B60H 1/00* (2006.01)

(52) U.S. Cl.
CPC ....... *B60H 1/0073* (2019.05); *B60H 1/00657* (2013.01); *B60H 1/00785* (2013.01); *B60H 1/008* (2013.01)

(58) Field of Classification Search
None
See application file for complete search history.

(56) References Cited

U.S. PATENT DOCUMENTS

2011/0246022 A1 10/2011 Bai
2020/0238786 A1 7/2020 Murphy et al.
(Continued)

FOREIGN PATENT DOCUMENTS

JP 2008-290701 A 12/2008
JP 2020-075668 A 5/2020
(Continued)

OTHER PUBLICATIONS

International Search Report issued in PCT/JP2024/011848; mailed Jun. 11, 2024.

*Primary Examiner* — Peter D Nolan
*Assistant Examiner* — Jacob Kent Besteman-Street
(74) *Attorney, Agent, or Firm* — Studebaker Brackett PLLC

(57) ABSTRACT

A vehicle thermal management control system includes: a first vehicle including a specific sensor for detecting specific thermal management information, a plurality of sensors that detects other information different from the specific thermal management information, and a control device that performs vehicle control including thermal management control based on detection information of the specific sensor and the plurality of sensors; and a second vehicle without the specific sensor, the second vehicle including a control device that performs vehicle control including thermal management control equivalent to that of the first vehicle, in which the control device of the second vehicle uses a learned estimation model, taking, as training data, the specific thermal management information detected by the first vehicle and related information relevant to the specific thermal management information, and performs thermal management control on the basis of estimation information of the specific sensor obtained by the learned estimation model.

8 Claims, 8 Drawing Sheets

(56) References Cited

U.S. PATENT DOCUMENTS

| | | | | |
|---|---|---|---|---|
| 2024/0140392 | A1* | 5/2024 | Boaretto | B60W 10/26 |
| 2025/0206101 | A1* | 6/2025 | Xu | B60H 1/00828 |

FOREIGN PATENT DOCUMENTS

| | | | |
|---|---|---|---|
| JP | 2022-518455 | A | 3/2022 |
| JP | 2022-126077 | A | 8/2022 |

* cited by examiner

FIG. 4

Tb

| ID | TIME | IGN | SPEED | BAV | OPA | WOC | DOC | MODE | $CO_2$ |
|---|---|---|---|---|---|---|---|---|---|
| 00001 | 2022/9/20 18:28:00 | OFF | 0 | 0 | 0 | 0 | 1 | 0 | 450 |
| 00002 | 2022/9/20 18:28:00 | OFF | 0 | 0 | 0 | 0 | 1 | 0 | 450 |
| 00003 | 2022/9/20 18:28:00 | OFF | 0 | 0 | 0 | 0 | 1 | 0 | 450 |
| 00001 | 2022/9/20 18:28:01 | ON | 0 | H | 1 | 0 | 1 | 0 | 450 |
| 00002 | 2022/9/20 18:28:01 | ON | 0 | H | 2 | 0 | 1 | 0 | 450 |
| 00003 | 2022/9/20 18:28:01 | ON | 0 | H | 2 | 0 | 1 | 0 | 450 |
| 00001 | 2022/9/20 18:28:02 | ON | 5 | H | 1 | 0 | 0 | 0 | 455 |
| 00002 | 2022/9/20 18:28:02 | ON | 5 | H | 2 | 0 | 0 | 0 | 455 |
| 00003 | 2022/9/20 18:28:02 | ON | 5 | H | 2 | 0 | 0 | 0 | 455 |
| … | … | … | … | … | … | … | … | … | … |
| 00001 | 2022/9/20 19:10:00 | ON | 40 | L | 1 | 0 | 0 | 0 | 555 |
| 00002 | 2022/9/20 19:10:00 | ON | 40 | L | 2 | 0 | 0 | 0 | 555 |
| 00003 | 2022/9/20 19:10:00 | ON | 40 | L | 2 | 0 | 0 | 0 | 555 |
| 00001 | 2022/9/20 19:10:01 | ON | 40 | L | 1 | 0 | 0 | 1 | 480 |
| 00002 | 2022/9/20 19:10:01 | ON | 40 | L | 2 | 0 | 0 | 1 | 480 |
| 00003 | 2022/9/20 19:10:01 | ON | 40 | L | 2 | 0 | 0 | 1 | 480 |
| 00001 | 2022/9/20 19:10:02 | ON | 45 | L | 1 | 1 | 0 | 1 | 430 |
| 00002 | 2022/9/20 19:10:02 | ON | 45 | L | 2 | 0 | 0 | 1 | 455 |
| 00003 | 2022/9/20 19:10:02 | ON | 45 | L | 2 | 0 | 0 | 1 | 455 |
| … | … | … | … | … | … | … | … | … | … |

HEAT MANAGEMENT CONTROL SYSTEM FOR VEHICLE

TECHNICAL FIELD

The present invention relates to a vehicle thermal management control system.

BACKGROUND ART

A vehicle thermal management control apparatus including an in-vehicle air-conditioning system includes sensors for detecting, for example, a refrigerant temperature and a refrigerant pressure in a refrigerant circuit, and sensors that detect, for example, the temperature of and the velocity of flow of a heating medium that exchanges heat with a refrigerant, and controls, for example, the refrigerant circuit and a heating medium circuit, or an air-conditioning unit on the basis of detection information of these sensors.

Moreover, for finer control, a vehicle thermal management control apparatus is known which includes not only the above-mentioned sensors that detect, for example, the state of the refrigerant and the state of the heating medium but also a $CO_2$ concentration sensor for detecting the concentration of carbon dioxide in the interior of a vehicle (refer to Patent Literature 1 below).

CITATION LIST

Patent Literature

Patent Literature 1: JP-A-2008-290701

SUMMARY OF INVENTION

Problems to be Solved by Invention

In the vehicle thermal management control apparatus, various sensors are required to perform various types of control as described above. However, when an expensive sensor such as a $CO_2$ concentration sensor is mounted on each vehicle, if a plurality of vehicles is subject to centralized control, there arises a problem that the cost of each vehicle is high and the total management cost of the vehicles subject to centralized control increases dramatically.

In this respect, it is conceivable to, in a single vehicle, estimate detection information of an expensive sensor such as $CO_2$ concentration from detection information of various sensors and perform thermal management control, thereby omitting the expensive sensor and reducing the cost. However, it has a problem that highly accurate thermal management control cannot be performed as compared to a case where a $CO_2$ concentration sensor is actually used.

An object of the present invention is to handle such a problem. In other words, an object of the present invention is, for example, to, in a vehicle thermal management control system, omit an expensive sensor to suppress an increase in the cost of a vehicle and at the same time enable achievement of control that is as highly accurate as control in a case where the omitted sensor is mounted.

Solution to Problems

In order to solve such a problem, the present invention has the following configuration:

A vehicle thermal management control system that performs thermal management control on a vehicle on the basis of thermal management information acquired by the vehicle, the vehicle thermal management control system including: a first vehicle including a specific sensor for detecting specific thermal management information, a plurality of sensors that detects other information different from the specific thermal management information, and a control device that performs vehicle control including thermal management control based on the detection information of the specific sensor and the plurality of sensors; and a second vehicle without the specific sensor, the second vehicle including a control device that performs vehicle control including thermal management control equivalent to that of the first vehicle, in which the control device of the second vehicle uses a learned estimation model, taking, as training data, the specific thermal management information detected by the first vehicle and related information relevant to the specific thermal management information, and performs thermal management control on the basis of estimation information of the specific sensor obtained by the learned estimation model.

Effects of Invention

In terms of the present invention having such features, in a vehicle thermal management control system, it is possible to omit an expensive sensor to suppress an increase in the cost of a vehicle and at the same time enable achievement of thermal management control that is as highly accurate as control in a case where the omitted sensor is mounted.

BRIEF DESCRIPTION OF DRAWINGS

FIG. 4 is an explanatory diagram illustrating an example of a training data table.

DESCRIPTION OF EMBODIMENTS

Figure 1:
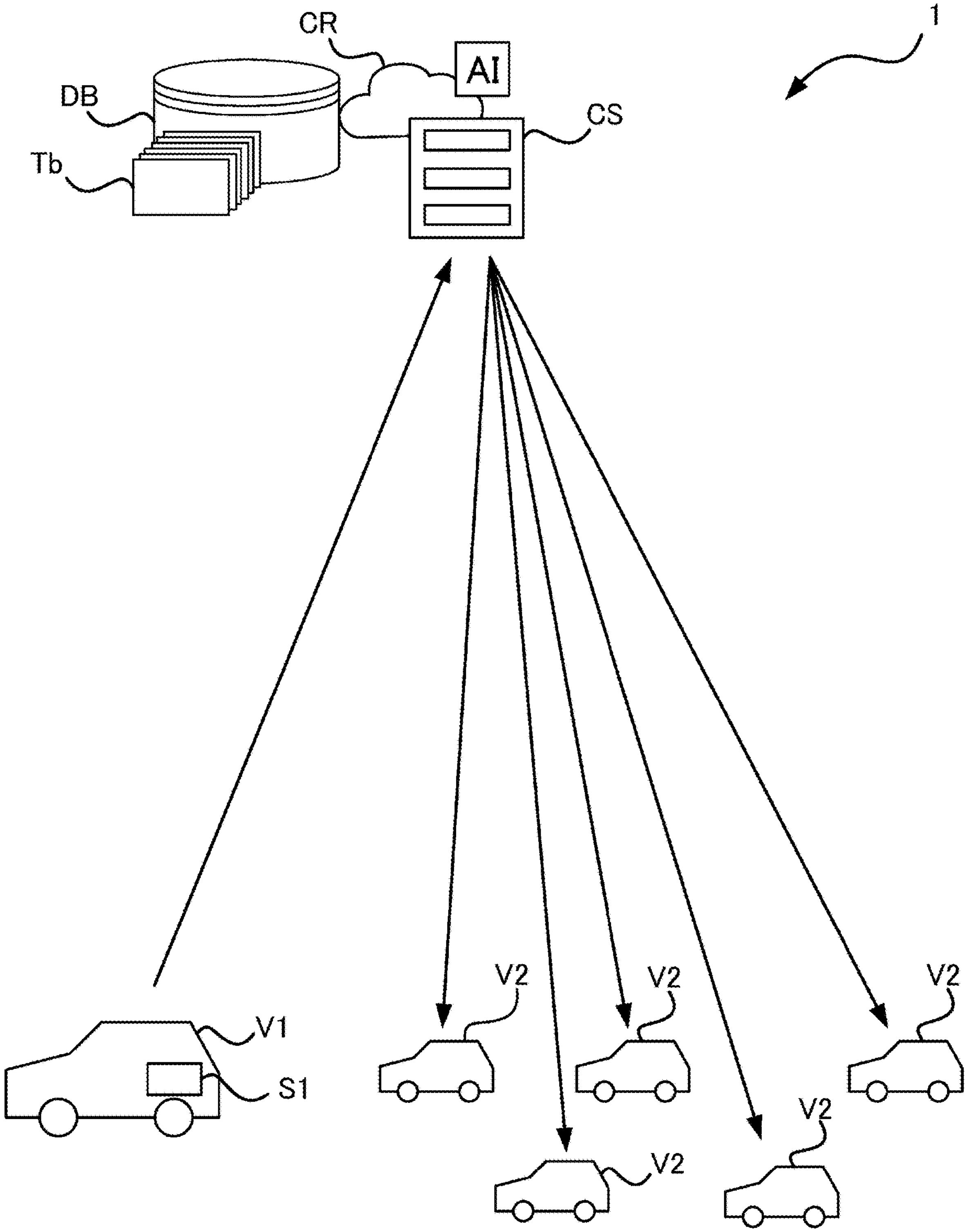
FIG. 1 is an explanatory diagram illustrating a configuration example of a vehicle thermal management control system according to an embodiment of the present invention.

An embodiment of the present invention is described hereinafter with reference to the drawings. In the following description, the same reference numerals in different drawings indicate parts having the same functions, and redundant descriptions in the drawings are omitted as appropriate.

FIG. 1 illustrates a configuration example of a vehicle thermal management control system (hereinafter, a system)

according to the embodiment of the present invention. In the illustrated example, a system 1 is constructed by a first vehicle V1, a second vehicle V2, and a server CS on a cloud CR. An example of using the server CS on the cloud CR is presented here. However, if the first vehicle V1 and the second vehicle V2 can carry out information communications with each other, a control device (illustration omitted) included in the first vehicle V1 or the second vehicle V2 is caused to have a function similar to that of the server CS on the cloud CR, and the system 1 can be controlled between the vehicles, not via the server CS.

The first vehicle V1 is a vehicle on which a specific sensor S1 is mounted. The specific sensor S1 is a sensor for detecting specific thermal management information necessary for the system 1 to perform thermal management control. The specific sensor S1 may be one type of sensor or a plurality of types of sensors. Moreover, the specific sensor S1 may be a single sensor or a sensor group including a plurality of sensors.

The second vehicle V2 is a vehicle on which the above-mentioned specific sensor S1 is not mounted. Here, the specific sensor S1 is a relatively high-cost sensor, and the second vehicle V2 without the specific sensor S1 can be produced at a lower cost than the first vehicle V1 on which the specific sensor S1 is mounted. Incidentally, it is preferable that the second vehicle V2 be equivalent (in model, size, and type) to the first vehicle V1 except the fact that the specific sensor S1 is not mounted.

Moreover, it is preferable that there be a plurality of the second vehicles V2 for one first vehicle V1 (for example, 999 second vehicles V2 for one first vehicle V1 in the system 1 including 1000 vehicles) as constituent elements of the system 1. Note that there may be a plurality of the first vehicles V1 in the system 1.

A control model is constructed/added in such a manner that the second vehicle V2 without the specific sensor S1 is also subject to similar control on the basis of information of the first vehicle V1 including the specific sensor S1. Therefore, it is possible to execute highly accurate control without adding the specific sensor S1 to the second vehicle V2. Therefore, it is possible to suppress an increase in the number of sensors of the second vehicle V2, and as a result, it is possible to achieve a reduction in the cost of the vehicle.

Figure 2:
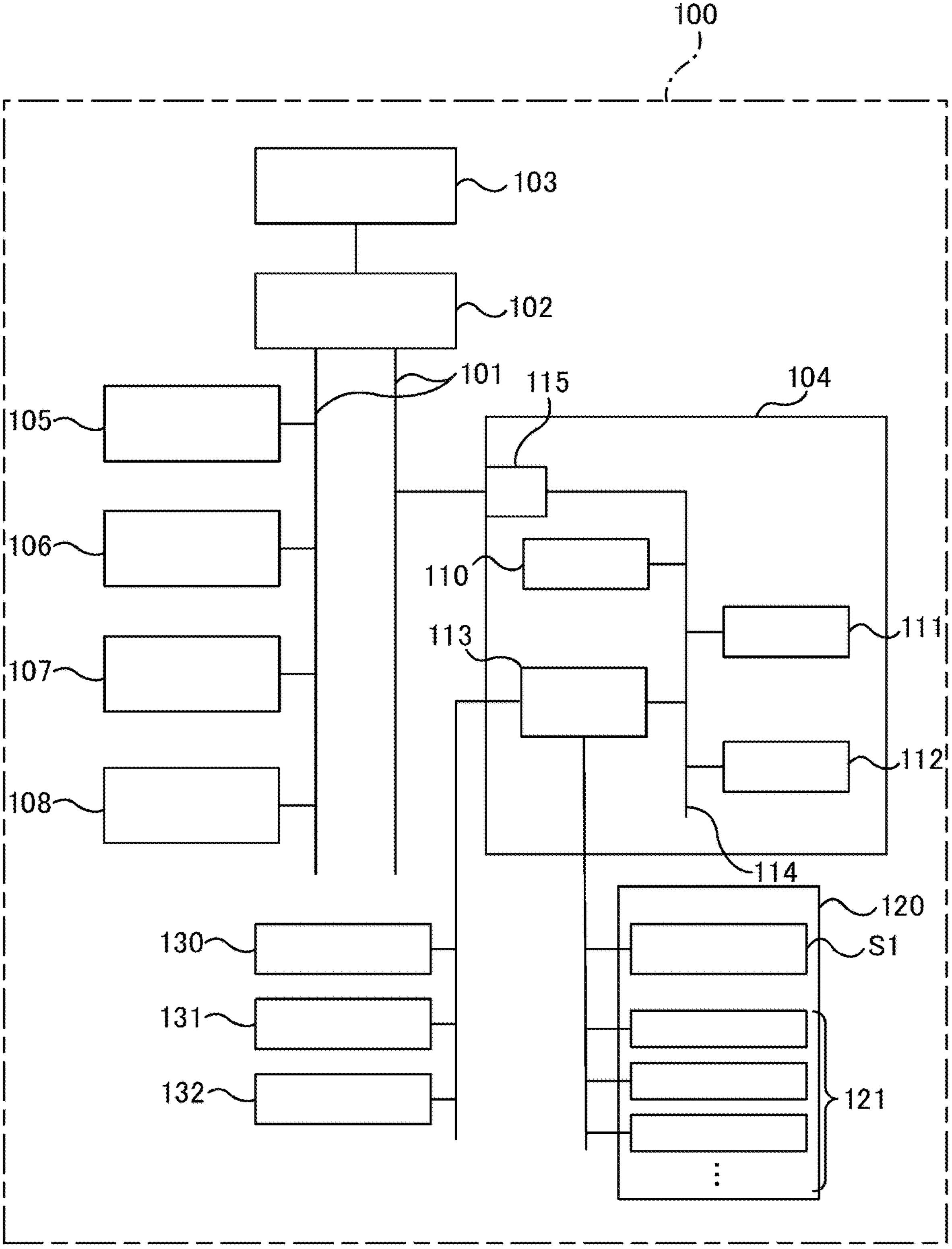
FIG. 2 is an explanatory diagram illustrating a control device of a first vehicle in the vehicle thermal management control system according to the embodiment of the present invention.

The first vehicle V1 includes a control device 100 as illustrated in FIG. 2. The control device 100 is configured by connecting a plurality of vehicle-mounted electronic control units (ECU) via an in-vehicle network 101 such as a controller area network (CAN) or a local interconnect network (LIN) in such a manner as to be able to carry out information communications with one another. One of the plurality of vehicle-mounted ECUs is a relay ECU 102 (Central Gateway ECU: CGWECU) having a relay function between bus lines of a plurality of systems in the in-vehicle network 101, another one is a communication ECU 103 (Telematics Control Unit: TCU) for carrying out bidirectional information communications between the vehicle and the outside, and still another one is a thermal management control ECU 104 that performs thermal management control on the vehicle.

Each of the above-mentioned vehicle-mounted ECUs can include, for example, a processor such as a central processing unit (CPU) or a micro processing unit (MPU), an electrical circuit, and memory devices such as random access memory (RAM) and read only memory (ROM). Moreover, a part or all of operations that are executed by the vehicle-mounted ECUs can also be implemented by hardware such as an application specific integrated circuit (ASIC), a field-programmable gate array (FPGA), or a graphics processing unit (GPU).

In the illustrated example, the thermal management control ECU 104 includes a CPU 110, a ROM 111, a RAM 112, and an external Interface (I/F) 113, and these pieces of hardware are mutually connected via a bus line 114, and the bus line 114 is connected to the in-vehicle network 101 via a gateway 115. Here, the CPU 110 executes various programs stored in the ROM 111 to control the operation of the thermal management control ECU 104. The ROM 111 is nonvolatile memory, and stores, for example, the programs that are executed by the CPU 110, and data necessary for the CPU 110 to execute the programs. The RAM 112 is a main memory storage such as dynamic random access memory (DRAM) or static random access memory (SRAM), and functions as, for example, a work area that is used when the CPU 110 executes the programs. The external I/F 113 controls transmission and reception of signals to and from the outside, and, for example, receives detection information necessary for control from a sensor unit including a plurality of sensors, and transmits a control signal to an actuator that executes a control target operation. Note that all the vehicle-mounted ECUs can adopt a hardware configuration similar to that of the illustrated thermal management control ECU.

A sensor unit 120 for detecting thermal management information necessary for thermal management control is connected to the external I/F 113 of the thermal management control ECU 104. The sensor unit 120 is a group of various sensors (a sensor group) installed in various places, one of which is the above-mentioned specific sensor S1. Moreover, the sensor unit 120 includes a plurality of sensors (a sensor (1), a sensor (2), a sensor (3) . . . ) 121 for detecting, for example, an outside temperature, an inside temperature, discharge air quantity, a refrigerant temperature, a refrigerant pressure, a heating medium temperature, the velocity of flow of a heating medium, and a battery temperature.

Moreover, for example, an air-conditioning unit (HVAC: Heating, Ventilation, and Air Conditioning) 130, a refrigerant circuit 131, and a heating medium circuit 132, which are control targets of the thermal management control ECU 104, are connected to the external I/F 113 of the thermal management control ECU 104, and the thermal management control ECU 104 transmits control signals to the control targets. The air-conditioning unit 130 blows conditioned air for cooling or heating into the interior of the vehicle while controlling switching between an outside air introduction mode and an inside air circulation mode as appropriate. The refrigerant circuit 131 serves as a heat source for the vehicle, and executes a refrigeration cycle that condenses, decompresses, and vaporizes a gaseous refrigerant pressurized by a compressor to absorb and release heat of the refrigerant. The heating medium circuit 132 circulates the heating medium that exchanges heat with the refrigerant in the refrigerant circuit 131 to manage heat of various places in the vehicle.

In addition to the above-mentioned vehicle-mounted ECUs, many vehicle-mounted ECUs are connected to the in-vehicle network 101 in order to perform various types of control on the vehicle. FIG. 2 illustrates examples of the vehicle-mounted ECUs. A driveline ECU 105 includes a vehicle speed sensor as a sensor unit, and controls, for example, a drive motor. A door control ECU 106 includes a door open/closed sensor and a window open/closed sensor as a sensor unit, and controls the operation of, for example, a door lock mechanism and a power window. A seat control ECU 107 includes a seat occupancy sensor and a seatbelt buckle sensor as a sensor unit, and controls adjustment movements of a seat and turning-on/off of a seat heater. A vehicle-mounted camera control ECU 108 includes an indoor camera and an outdoor camera as a sensor unit, and performs, for example, image processing on an acquired image.

Figure 3:
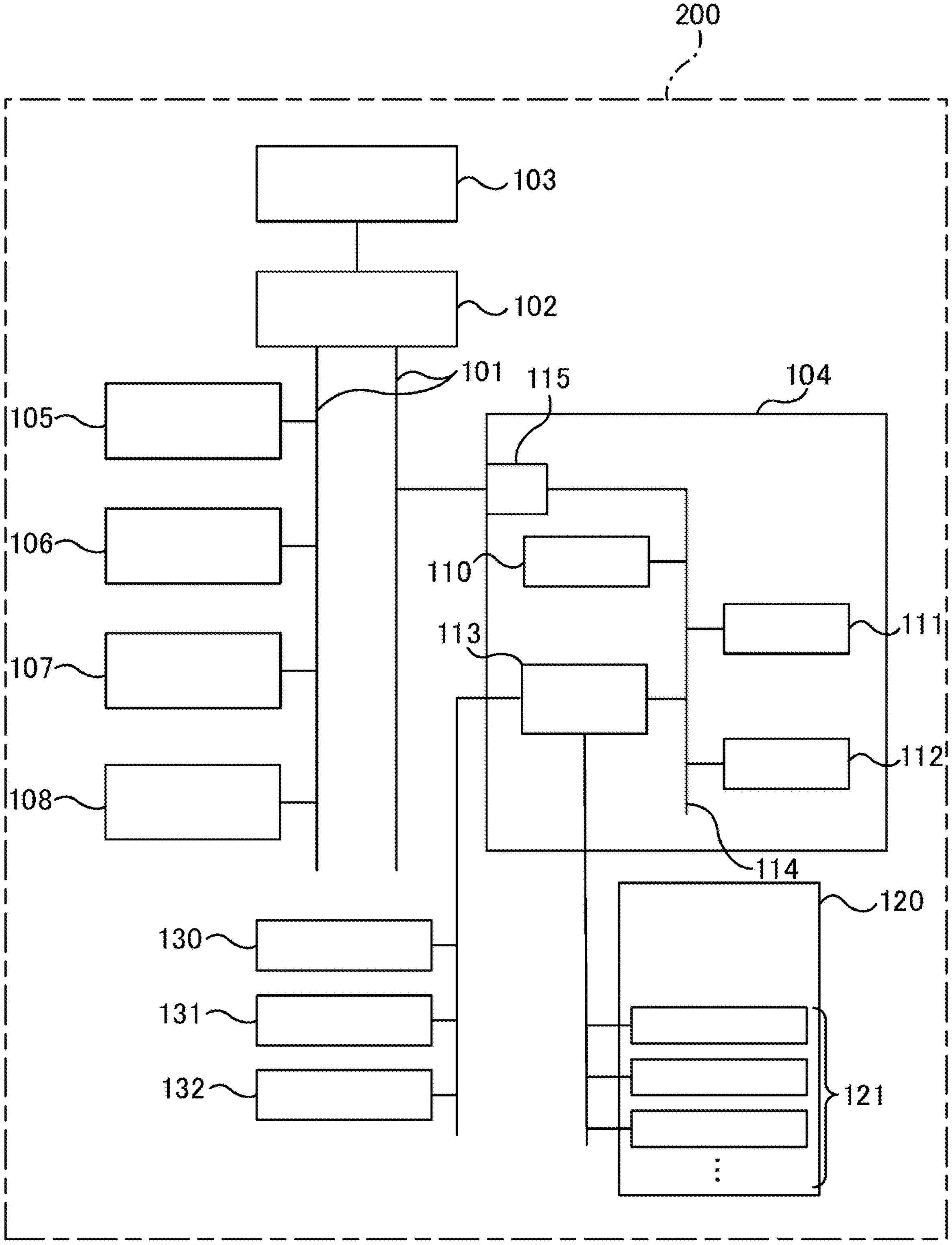
FIG. 3 is an explanatory diagram illustrating a control device of a second vehicle in the vehicle thermal management control system according to the embodiment of the present invention.

In contrast, the second vehicle V2 includes a control device 200 as illustrated in FIG. 3. The control device 200 is similar to the control device 100 of the first vehicle V1 except the fact that the above-mentioned specific sensor S1 is not provided. Therefore, redundant descriptions are omitted.

Control of the system 1 is described below. Here, a description is given, taking a $CO_2$ concentration sensor in the interior of the vehicle as an example of the specific sensor S1. However, the embodiment of the present invention is not particularly limited to the $CO_2$ concentration sensor.

In FIG. 1, the first vehicle V1 travels under vehicle control by the various vehicle-mounted ECUs of the control device 100 while performing thermal management control by the thermal management control ECU 104 of the control device 100. Therefore, various pieces of information are transmitted from the communication ECU 103 of the control device 100 to the server CS on the cloud CR as occasion arises. At this point in time, the first vehicle V1 transmits training data to the server CS. The training data includes detection information of the $CO_2$ concentration sensor being the specific sensor S1 for detecting specific thermal management information ($CO_2$ concentration in the vehicle interior), and related information related to the detection information. The related information is information selected from detection information of a plurality of sensors and control outputs of the control device 100 upon vehicle control including thermal management control, the information being relevant to the specific thermal management information ($CO_2$ concentration in the vehicle interior).

Specifically, the information that is transmitted from the first vehicle V1 to the server CS is information on indoor $CO_2$ concentration that is detected by the specific sensor S1 while driving the vehicle and information related to the $CO_2$ concentration information, and is information on, for example, the vehicle speed, the discharge air quantity of the air-conditioning unit 130, the number of occupants, occupant attributes (such as the ratio of adults to children), switching of the air-conditioning unit 130 between the inside air circulation mode and the outside air introduction mode, the open or closed state of the door window, and the open or closed state of the door while driving the first vehicle V1. Here, the vehicle speed is obtained from the sensor unit of the driveline ECU 105. The discharge air quantity is obtained from the sensor unit of the thermal management control ECU 104. The number of occupants is obtained from the sensor unit of the seat control ECU 107. The occupant attributes are obtained from the image processing output of the vehicle-mounted camera control ECU. The switching between the inside air circulation mode and the outside air introduction mode (hereinafter the mode switching) is obtained from the control output of the thermal management control ECU 104. The open or closed state of the door window and the open or closed state of the door are obtained from the sensor unit of the door control ECU.

As illustrated in FIG. 1, a database DB of the training data that has been transmitted is constructed on the server CS or the cloud CR to which the server CS is connected. FIG. 4 illustrates a form for databasing the training data, and illustrates a training data table Tb in which the training data is tabulated on a time-series basis. "ID" in the drawing is an ID (identification) for identifying the first vehicle V1 on which specific sensor S1 is mounted. Here, a case where there is a plurality of the first vehicles V1 is presented. "TIME" in the drawing indicates the date and time of reception of the training data. "IGN" in the drawing indicates the operating status of the vehicle, "ON" indicates an active status, and "OFF" indicates an inactive status. The numerical value of "SPEED" in the drawing indicates the vehicle speed in km/h. "BAV" in the drawing indicates a large discharge air quantity as "H", and indicates a small air quantity as "L". "OPA" in the drawing indicates a combined total, assigning "1" to an adult and "0.5" to a child and taking the occupant attributes into consideration. "WOC" in the drawing is the open or closed state of the window, "0" indicates the closed door window, and "1" indicates the open door window. "DOC" in the drawing indicates the open or closed state of the door, "0" indicates the closed door, and "1" indicates the open door. "MODE" in the drawing indicates the switching between the inside air circulation mode and the outside air introduction mode, "0" indicates the inside air circulation mode, and "1" indicates the outside air introduction mode. "$CO_2$" in the drawing is $CO_2$ concentration, and indicates the $CO_2$ concentration detected by the specific sensor S1 in ppm.

The first vehicle V1 may be configured in such a manner as to transmit the training data at any time when the communication ECU 103 can communicate with the server CS, or may be configured in such a manner as to accumulate the training data for a certain period of time (for example, one day) in memory in the control device 100 of the first vehicle V1 to create the training data table Tb and transmit the certain period of time (one day) worth of the training data table Tb to the server CS at predetermined times. A sufficient driving period of the first vehicle V1 is secured. Therefore, the training data table Tb includes a large amount of data, and big data of the training data is constructed in the database DB.

The server CS on the cloud CR creates an artificial intelligence (AI) model (estimation model) for estimating the detection information (the $CO_2$ concentration) of the specific sensor S1 on the basis of the training data table Tb accumulated in the database DB, using a machine learning function (machine learning program) by AI of the server CS itself or AI available on the cloud CR. As an example of the estimation model, a multiple regression analysis model can be adopted in which the detection information (the $CO_2$ concentration) of the specific sensor S1 to be estimated is used as an object variable and the related information in the training data is used as an explanatory variable. However, the estimation model is not limited to the multiple regression analysis model, and an appropriate estimation model created by a known machine learning function can be adopted.

The estimation model created by the server CS machine-learning from many training data tables Tb is distributed as a learned estimation model to a plurality of the second vehicles V2. When receiving the learned estimation model distributed by the server CS, the second vehicle V2 stores the learned estimation model in its own control device 200, and outputs estimation information of the specific sensor S1 by use of the learned estimation model.

A thermal management control logic related to the indoor $CO_2$ concentrations of the first vehicle V1 and the second vehicle V2 is described. The thermal management control ECU 104 in the control device 100 of the first vehicle V1 acquires various types of detection information from the sensor unit 120 and performs thermal management control including air-conditioning control and at the same time acquires detection information of the $CO_2$ concentration detected by the specific sensor S1, and determines whether the detected $CO_2$ concentration is higher or lower than a set value. If the detected $CO_2$ concentration is higher than the set value, the thermal management control ECU 104 in the control device 100 switches the air-conditioning unit 130 to the outside air introduction mode and, if the detected $CO_2$ concentration is lower than the set value, maintains the current status when the current status is the inside air circulation mode, and switches the air-conditioning unit 130 to the inside air circulation mode when the current status is the outside air introduction mode.

Figure 5:
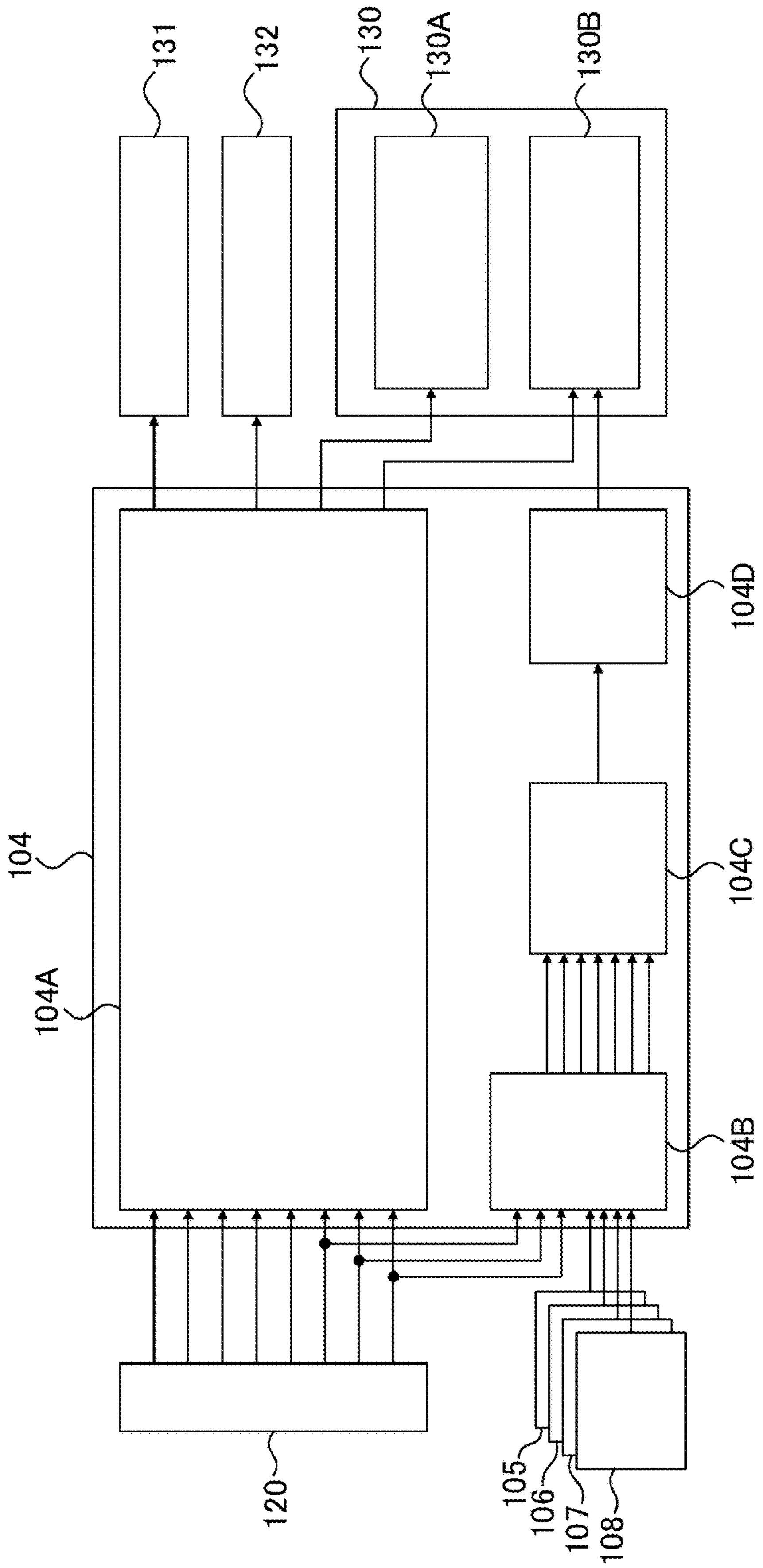
FIG. 5 is an explanatory diagram explaining an example of a control logic of a thermal management control ECU in the control device of the second vehicle.

In contrast, as illustrated in FIG. 5, the thermal management control ECU 104 in the control device 200 of the second vehicle V2 includes functions (programs) of a thermal management control unit 104A, a learned estimation model 104C distributed from the server CS, a related information selection unit 104B that selects related information to input into the learned estimation model 104C, and a $CO_2$ concentration determination unit 104D that determines $CO_2$ concentration on the basis of estimated $CO_2$ concentration (estimation information) estimated by the learned estimation model 104C.

The thermal management control unit 104A sends control signals to the refrigerant circuit 131, the heating medium circuit 132, and the air-conditioning unit 130 on the basis of various types of detection information of the sensor unit 120, and performs thermal management control in the refrigerant circuit 131 and the heating medium circuit 132 and a normal air-conditioning operation (130A) in the air-conditioning unit 130. Moreover, the thermal management control unit 104A performs switching control between the inside air circulation mode and the outside air introduction mode in a DEF mode or in a mode selected by the occupant. Consequently, the $CO_2$ concentration in the vehicle interior changes, but this mode switching information is inputted into the learned estimation model 104C described below as the related information.

The related information selection unit 104B acquires a part of the various types of detection information of the sensor unit 120 and also acquires control outputs from other vehicle-mounted ECUs (such as the driveline ECU 105, the door control ECU 106, the seat control ECU 107, and the vehicle-mounted camera control ECU 108), selects related information (here, for example, the vehicle speed, the discharge air quantity, the number of occupants, the occupant attributes, the switching information between outside air introduction mode and the inside air circulation mode, the open/closed door window information, and the open/closed door information) to input into the learned estimation model 104C, and inputs the selected related information into the learned estimation model 104C.

The learned estimation model 104C obtains estimation information (estimated $CO_2$ concentration) of the specific sensor S1 that is not mounted on the second vehicle V2 on the basis of the inputted related information, and outputs the estimation information to the $CO_2$ concentration determination unit 104D. The $CO_2$ concentration determination unit 104D determines whether the inputted estimated $CO_2$ concentration is higher or lower than a set value and, if the estimated $CO_2$ concentration is higher than the set value, executes inside air circulation/outside air introduction mode switching (130B) of the air-conditioning unit 130 to switch to the outside air introduction mode and, if the estimated $CO_2$ concentration is lower than the set value, and executes the switching (130B) to maintain the current status when the current status is the inside air circulation mode and to switch to the inside air circulation mode when the current status is the outside air introduction mode.

In this manner, the thermal management control ECU 104 in the control device 200 of the second vehicle V2 can perform control equivalent to that of the first vehicle V1 on which the specific sensor S1 is mounted even if the sensor unit 120 does not include the expensive specific sensor ($CO_2$ concentration sensor) S1. Consequently, it is possible to optimize the $CO_2$ concentration in the vehicle interior.

The specific sensor S1 in the first vehicle V1 can be not only the above-mentioned indoor $CO_2$ concentration sensor but also various sensors. One of examples thereof is a frost detection sensor. The frost detection sensor is a sensor that detects formation of frost on an outdoor heat exchanger in the refrigerant circuit 131, and can be configured, including a camera that images the outdoor heat exchanger of the refrigerant circuit 131, and a sensor that detects a ventilation air quantity of the outdoor heat exchanger.

If the specific sensor S1 is the above-mentioned frost detection sensor, the training data to be transmitted from the first vehicle V1 to the server CS is detection information (a camera image and a value of a ventilation air quantity sensor) of the frost detection sensor and related information related to the detection information. This related information includes the vehicle speed, the discharge air quantity, a compressor rotation speed of the refrigerant circuit 131, the outside temperature, an outlet water temperature (heating medium temperature) of the outdoor heat exchanger, and a refrigerant pressure of the refrigerant circuit 131. The server CS then creates a learned estimation model to obtain estimation information of the frost detection sensor from the training data, and distributes the learned estimation model to the second vehicle V2.

Figure 6:
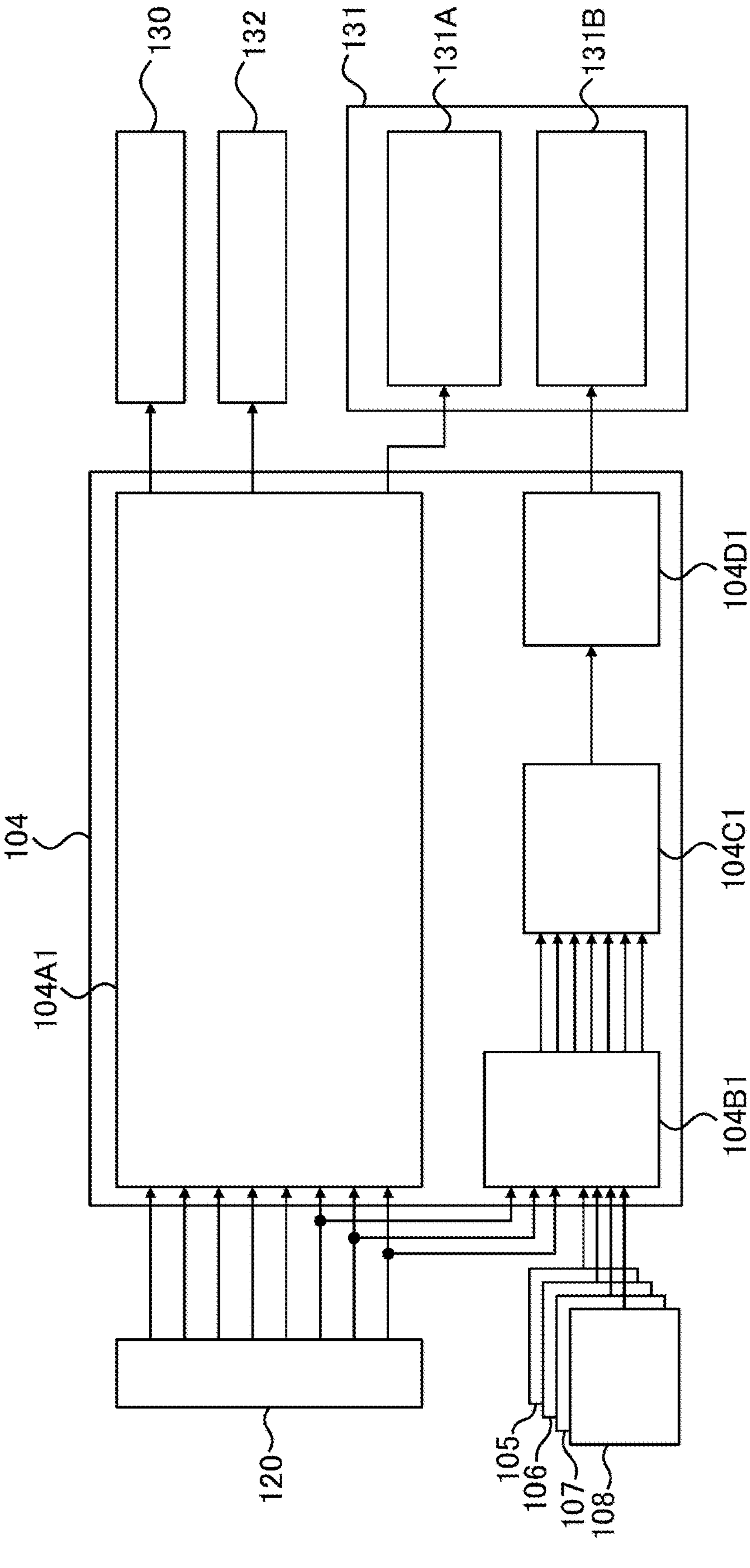
FIG. 6 is an explanatory diagram explaining another example of the control logic of the thermal management control ECU in the control device of the second vehicle.

A control logic of the thermal management control ECU 104 in the control device 200 of the second vehicle V2 in a case where the specific sensor S1 is the frost detection sensor is described with reference to FIG. 6. In this case, the thermal management control ECU 104 in the control device 200 of the second vehicle V2 includes functions (programs) of a thermal management control unit 104A1 that does not perform defrosting mode switching control, a learned estimation model 104C1 for obtaining estimation information of the frost detection sensor distributed from the server CS, a related information selection unit 104B1 that selects related information to input into the learned estimation model 104C1, and a frost formation determination unit 104D1 that determines whether or not frost forms on the outdoor heat exchanger on the basis of estimation information estimated by the learned estimation model 104C1.

The thermal management control unit 104A1 sends control signals to the air-conditioning unit 130, the refrigerant circuit 131, and the heating medium circuit 132 on the basis of various types of detection information of the sensor unit 120, and performs thermal management control in the air-conditioning unit 130 and the heating medium circuit 132 and a normal thermal management operation (131A) in the refrigerant circuit 131.

The related information selection unit 104B1 acquires a part of the various types of detection information of the sensor unit 120 and also acquires control outputs from other vehicle-mounted ECUs (such as the driveline ECU 105, the door control ECU 106, the seat control ECU 107, and the vehicle-mounted camera control ECU 108), selects the above-mentioned related information to input into the learned estimation model 104C1, and inputs the selected related information to the learned estimation model 104C1.

The learned estimation model 104C1 obtains estimation information (frost detection information) of the specific sensor S1 that is not mounted on the second vehicle V2, on the basis of the inputted related information, and outputs the estimation information to the frost formation determination unit 104D1. The frost formation determination unit 104D1 determines whether the inputted estimation information is higher or lower than a set state and, if the inputted estimation information is higher than the set state (if frost is forming), executes a defrosting mode switching operation (131B) of the refrigerant circuit 131 to execute a defrosting mode and, if the inputted estimation information is lower than the set state (if frost has not formed), does not switch to the defrosting mode of the refrigerant circuit 131.

Another example of the specific sensor S1 is a battery temperature sensor for detecting temperature distribution of battery cells. The battery temperature sensor is usually provided at each of an inlet and an outlet to a battery case in a heating medium circuit that cools the battery. However, if a difference in temperature between the battery cells in the battery case increases, it leads to deterioration of the battery. Therefore, in order to accurately manage the temperature of the battery, it is necessary to provide a plurality of battery temperature sensors (preferably, one per battery cell) in the battery case to grasp the temperature distribution of the battery cells.

However, as the number of battery temperature sensors increases, the cost increases accordingly. Therefore, in the first vehicle V1, a plurality of battery temperature sensors is provided in the battery case to accurately manage the temperature of the battery on the basis of the temperature distribution of the battery cells, and in the second vehicle V2, the temperature distribution of the battery cells is estimated using a learned estimation model while the temperature of the battery is managed with a normal battery temperature sensor, and thermal management control based on the temperature distribution of the battery cells is performed on the basis of the estimation information.

If the specific sensor S1 is a plurality of battery temperature sensors that detects the temperature distribution of the battery cells, the training data that is transmitted from the first vehicle V1 to the server CS is detection information of the temperature distribution of the battery cells detected by the plurality of battery temperature sensors and related information related to the detection information. This related information includes the vehicle speed, the remaining battery charge, the battery current, the outside temperature, a battery temperature adjustment water temperature, and the battery temperature adjustment water flow rate. The server CS then creates a learned estimation model from this training data to obtain estimation information that detects the temperature distribution of the battery cells, and distributes the learned estimation model to the second vehicle V2.

Figure 7:
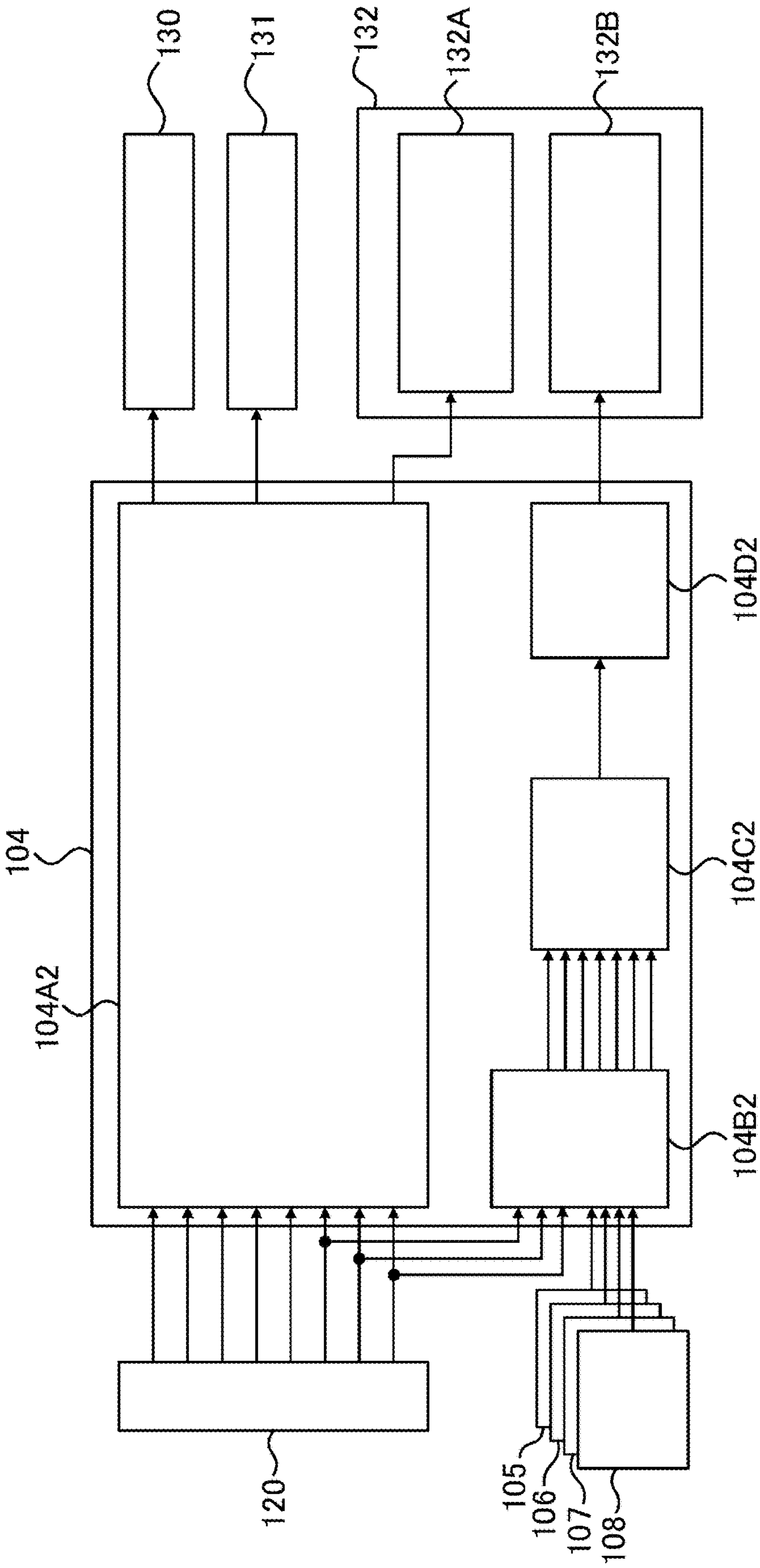
FIG. 7 is an explanatory diagram explaining another example of the control logic of the thermal management control ECU in the control device of the second vehicle.

A control logic of the thermal management control ECU 104 in the control device 200 of the second vehicle V2 in a case where the specific sensor S1 is the plurality of battery temperature sensors that detects the temperature distribution of the battery cells is described with reference to FIG. 7. In this case, the thermal management control ECU 104 in the control device 200 of the second vehicle V2 includes functions (programs) of a thermal management control unit 104A2 that does not perform battery cell temperature distribution based control, a learned estimation model 104C2 distributed from the server CS, a related information selection unit 104B2 that selects related information to input into the learned estimation model 104C2, and a battery cell temperature distribution determination unit 104D2 that determines the temperature distribution of the battery cells on the basis of estimation information estimated by the learned estimation model 104C2.

The thermal management control unit 104A2 sends control signals to the air-conditioning unit 130, the refrigerant circuit 131, and the heating medium circuit 132 on the basis of various types of detection information of the sensor unit 120, and performs thermal management control in the air-conditioning unit 130 and the heating medium circuit 132 and a normal thermal management operation (132A) in the heating medium circuit 132.

The related information selection unit 104B2 acquires a part of the various types of detection information of the sensor unit 120 and also acquires control outputs from other vehicle-mounted ECUs (such as the driveline ECU 105, the door control ECU 106, the seat control ECU 107, and the vehicle-mounted camera control ECU 108), and selects the above-mentioned related information to input into the learned estimation model 104C2, and inputs the selected related information into the learned estimation model 104C2.

The learned estimation model 104C2 obtains a plurality of pieces of battery temperature sensor estimation information that detects the temperature distribution of the battery cells being the specific sensor S1 that is not mounted on the second vehicle V2, on the basis of the inputted related information, and outputs the estimation information to the battery cell temperature distribution determination unit 104D2. The battery cell temperature distribution determination unit 104D2 determines whether the inputted estimation information is higher or lower than a set state and, if the inputted estimation information is higher than the set state (if a difference in temperature between the battery cells is large), switches the heating medium circuit 132 to a battery cell temperature distribution based operation (132B) and performs temperature adjustment control in such a manner as to reduce the temperatures of the battery cells and, if the inputted estimation information is lower than the set state (if a difference in temperature between the battery cells is small), does not perform the battery cell temperature distribution based operation of the heating medium circuit 132.

Figure 8:
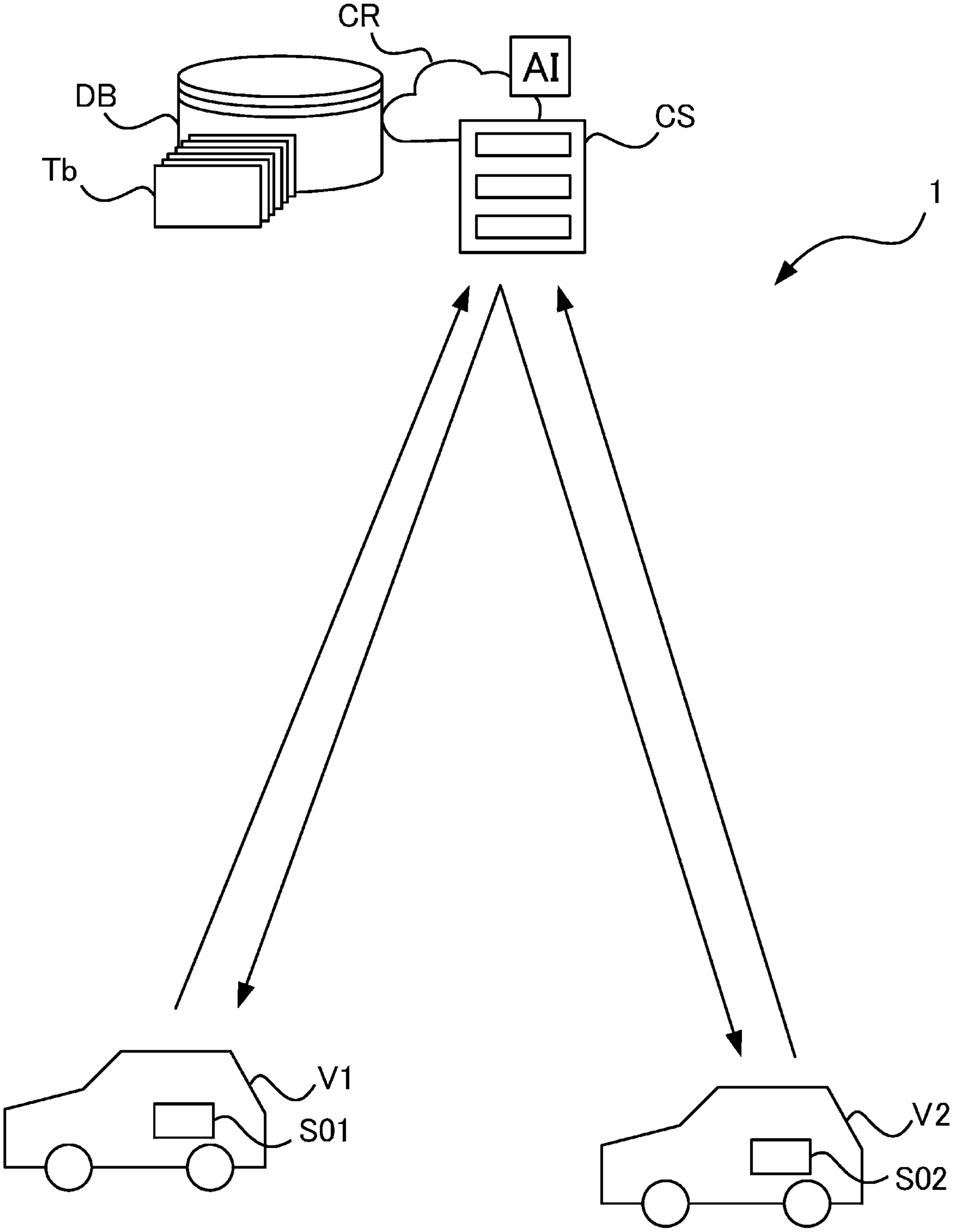
FIG. 8 is an explanatory diagram illustrating an example of use of the vehicle thermal management control system according to the embodiment of the present invention.

FIG. 8 illustrates an example of use of the system 1. In this example, the above-mentioned specific sensor S1 is assumed to be a first specific sensor S01 and a second specific sensor S02, and the system is configured in such a manner that the first vehicle V1 is equipped with the first specific sensor S01, but is not equipped with the second specific sensor S02, and the second vehicle V2 is not equipped with the first specific sensor S01, but is equipped with the second specific sensor S02. The first vehicle V1 transmits training data including detection information of the first specific sensor S01 and related information related to the detection information to the server CS, and the second vehicle V2 transmits training data including detection information of the second specific sensor S02 and related information related to the detection information to the server CS.

At this point in time, the server CS creates a learned estimation model for distribution to the second vehicle V2 on the basis of the training data transmitted from the first vehicle V1, and creates a learned estimation model for distribution to the first vehicle V1 on the basis of the training data transmitted from the second vehicle V2. Here, the learned estimation model to be distributed to the first vehicle V1 is a model for obtaining estimation information of the second specific sensor S02 that is not mounted on the first vehicle V1, and the learned estimation model to be distributed to the second vehicle V2 is a model for obtaining estimation information of the first specific sensor S01 that is not mounted on the second vehicle V2.

According to such an example of use of the system 1, the sensors that are not mounted on the first vehicle V1 and the second vehicle V2 can be compensated each other by the estimation information. Therefore, it is possible to execute accurate thermal management control while reducing the cost. As examples, the first specific sensor S01 can be a $CO_2$ concentration sensor in the vehicle, and the second specific sensor S02 can be a PM2.5 detection sensor (particulate matter detection sensor) outside the vehicle.

In this example, when the thermal management control ECUs 104 of the first vehicle V1 and the second vehicle V2 perform the inside air circulation/outside air introduction mode switching control in the air-conditioning unit 130, in the first vehicle V1, switching to the outside air introduction mode can be performed if it is determined from detection information of the $CO_2$ concentration sensor that $CO_2$ concentration in the vehicle interior is high, and switching from the outside air introduction mode to the inside air circulation mode can be performed if it is determined from estimation information of the PM2.5 detection sensor that PM2.5 outside the vehicle is high. Moreover, in the second vehicle V2, switching to the outside air introduction mode is performed if it is determined from estimation information of the $CO_2$ concentration sensor that the $CO_2$ concentration in the vehicle is high, and switching from the outside air introduction mode to the inside air circulation mode is performed if it is determined from detection information of the PM2.5 detection sensor that PM2.5 outside the vehicle is high.

Up to this point the embodiments of the present invention have been described in detail with reference to the drawings. However, the specific configuration is not limited to these embodiments, and, for example, modifications to the design within the scope that does not depart from the gist of the present invention are also included in the present invention. Moreover, the above-mentioned embodiments can be combined by diverting their technologies to one another as long as there is no particular contradiction or problem in, for example, their purposes and configurations.

LIST OF REFERENCE SIGNS

1 Vehicle thermal management control system (system)
V1 First vehicle
V2 Second vehicle
CS Server
CR Cloud
S1 Specific sensor
S01 First specific sensor
S02 Second specific sensor
DB Database
Tb Training data table
100, 200 Control device
101 In-vehicle network
102 Relay ECU
103 Communication ECU
104 Thermal management control ECU
105 Driveline ECU
106 Door control ECU
107 Seat control ECU
108 Vehicle-mounted camera control ECU
110 CPU
111 ROM
112 RAM
113 External I/F
114 Bus line
115 Gateway
120 Sensor unit
121 Sensor
130 Air-conditioning unit
131 Refrigerant circuit
132 Heating medium circuit
104A, 104A1, 104A2 Thermal management control unit
104B, 104B1, 104B2 Related information selection unit
104C, 104C1, 104C2 Learned estimation model
104D $CO_2$ concentration determination unit
104D1 Frost formation determination unit
104D2 Battery cell temperature distribution determination unit
130A Normal air-conditioning operation
131A, 132A Normal thermal management operation
130B Inside air circulation/outside air introduction mode switching
131B Defrosting mode switching operation
132B Battery cell temperature distribution based operation

The invention claimed is:

1. A vehicle thermal management control system that performs thermal management control on a vehicle on the basis of thermal management information acquired by the vehicle, the vehicle thermal management control system comprising:

a first vehicle including a specific sensor for detecting specific thermal management information, a plurality of sensors that detects other information different from the specific thermal management information, and a control device that performs vehicle control including thermal management control based on detection information of the specific sensor and the plurality of sensors; and a second vehicle without the specific sensor, the second vehicle including a control device that performs vehicle control including thermal management control equivalent to that of the first vehicle, wherein the control device of the second vehicle uses a learned estimation model, taking, as training data, the specific thermal management information detected by the first vehicle and related information relevant to the specific thermal management information, and performs thermal management control on the basis of estimation information of the specific sensor obtained by the learned estimation model.

2. The vehicle thermal management control system according to claim 1, wherein the related information is information selected from the detection information and control outputs of the first vehicle and the second vehicle.

3. The vehicle thermal management control system according to claim 1, wherein the specific sensor is an indoor $CO_2$ concentration sensor, and thermal management control that is performed by the first vehicle and the second vehicle on the basis of the specific thermal management information is switching control between inside air circulation and outside air introduction in vehicle air-conditioning.

4. The vehicle thermal management control system according to claim 1, wherein the specific sensor is a frost detection sensor, and thermal management control that is performed by the first vehicle and the second vehicle on the basis of the specific thermal management information is switching control to a defrosting mode in vehicle air-conditioning.

5. The vehicle thermal management control system according to claim 1, further comprising a server capable of exchanging information with the first vehicle and the second vehicle, wherein the server receives the training data from the first vehicle and creates the learned estimation model.

6. The vehicle thermal management control system according to claim 1, wherein the first vehicle transmits the training data to the server every set time, and the server distributes the learned estimation model that has been updated to the second vehicle every set time.

7. The vehicle thermal management control system according to claim 1, wherein the first vehicle includes a first specific sensor as the specific sensor, and a second specific sensor included in the second vehicle is omitted in the first vehicle, and the control device of the second vehicle performs vehicle control including thermal management control based on detection information of the second specific sensor, and the control device of the first vehicle uses a learned estimation model, taking, as training data, the detection information of the second specific sensor and related information related to the detection information, and performs thermal management control on the basis of estimation information of the second specific sensor obtained by the learned estimation model.

8. The vehicle thermal management control system according to claim 7, wherein the first specific sensor is an indoor $CO_2$ concentration sensor, and the second specific sensor is an outdoor particulate matter detection sensor.

* * * * *